United States Patent
Peden et al.

(10) Patent No.: US 11,706,590 B1
(45) Date of Patent: *Jul. 18, 2023

(54) METHOD AND SYSTEM TO FACILITATE MEDIA-CONTENT DELIVERY

(71) Applicant: Sprint Spectrum L.P., Overland Park, KS (US)

(72) Inventors: Mark Peden, Olathe, KS (US); Raymond E. Reeves, Oviedo, FL (US); Simon Youngs, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,442

(22) Filed: Sep. 22, 2021

Related U.S. Application Data

(63) Continuation of application No. 16/837,215, filed on Apr. 1, 2020, now Pat. No. 11,146,923.

(51) Int. Cl.
*H04W 4/12* (2009.01)
*H04W 4/50* (2018.01)
*H04W 88/18* (2009.01)

(52) U.S. Cl.
CPC ............. *H04W 4/12* (2013.01); *H04W 4/50* (2018.02); *H04W 88/184* (2013.01)

(58) Field of Classification Search
CPC ......... H04W 4/12; H04W 4/50; H04W 76/10; H04W 88/184; H04L 51/10; H04M 1/72436; H04M 3/42382; H04M 3/53333
See application file for complete search history.

(56) References Cited

U.S. PATENT DOCUMENTS

| | | | |
|---|---|---|---|
| 7,653,734 B1 | 1/2010 | Aho | |
| 7,917,161 B2 | 3/2011 | Tang et al. | |
| 2004/0148400 A1 | 7/2004 | Mostafa | |
| 2008/0026779 A1* | 1/2008 | Oh | H04L 51/224 455/466 |
| 2013/0235787 A1 | 9/2013 | Lin et al. | |
| 2019/0274082 A1* | 9/2019 | Vemuri | H04W 48/04 |

* cited by examiner

*Primary Examiner* — Quoc Thai N Vu
(74) *Attorney, Agent, or Firm* — McDonnell Boehnen Hulbert & Berghoff LLP

(57) ABSTRACT

A method and system for enabling MMS message delivery to a recipient device. An MMSC receives and stores MMS message content to be delivered to the recipient device, and the MMSC responsively sends to the recipient device an MMS-notification message carrying an address of the MMS message content stored at the MMSC and then receives a reply indicating that the recipient device received the MMS-notification message. The MMSC then detects that, after the MMSC received the reply, (i) at least a predefined threshold amount of time has passed and (ii) the MMSC has not yet received from the recipient device a request to download the MMS message content. And responsive to at least the detecting, the MMSC then sends to the recipient device a data-service-trigger message that triggers turning on data service of the recipient device, thus enabling MMS-message delivery to the recipient device.

20 Claims, 5 Drawing Sheets

US 11,706,590 B1

METHOD AND SYSTEM TO FACILITATE MEDIA-CONTENT DELIVERY

REFERENCE TO RELATED APPLICATION

This is a continuation of U.S. patent application Pub. Ser. No. 16/837,215, filed Apr. 1, 2020, the entirety of which is hereby incorporated by reference.

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could be configured to support Short Message Service (SMS) and Multimedia Messaging Service (MMS) communication.

SMS provides a mechanism to facilitate sending and receiving short text messages and the like over cellular networks without the need for the participating UEs to have established air-interface data connections, i.e., even when the UEs are in an idle mode rather than an active or connected mode. To facilitate this, SMS allows messages to be conveyed through air-interface control channels between UEs and their serving access nodes. Further, SMS provides for use of a network-based SMS Center (SMSC) that functions to store and forward short messages pending delivery of the messages to their destinations.

In typical implementation, when the SMSC receives an SMS message that is to be delivered to a destination UE, the SMSC stores the SMS message and queries a database such as a home location register (HLR) to identify a control entity such as a mobile switching center (MSC) that is currently serving the UE. The SMSC then sends the SMS message to that control entity, and the control entity forwards the SMS message to the UE's serving access node. In turn, if the UE is in an idle mode (lacking an established data connection), then the serving access node transmits the SMS message to the UE through a downlink air-interface control channel, such as a paging channel, in much the same way that the access node would transmit a page message for an incoming call.

This SMS messaging process could be used for UE-to-UE short message communication, with an originating UE generating an SMS message and transmitting the message to its serving access node for forwarding through a control entity to the SMSC, and for delivery by the SMSC to the destination UE as noted above. Further, the SMS messaging process could be used for delivery of specially coded control messages to UEs, such as control messages that are interpretable by a recipient UE to cause the UE to engage in wireless packet-data communication; such SMS control messages could be generated by an originating external short message entity (ESME) such as a network server and could be transmitted to the SMSC for delivery as noted above.

One of the limitations of SMS messaging is that it generally supports messages no longer than 160 characters, and it generally supports communication of just basic text content rather than multimedia content. The MMS protocol was developed as an extension of SMS messaging, to help overcome these limitations.

MMS facilitates communication of possibly rich media, such as pictures, videos, audio, text, or largely any of a variety of media content, to a UE. MMS does this by making use of an MMS Center (MMSC) that interworks with the SMSC, with the MMSC storing and forwarding the media content, and the SMSC engaging in control signaling to cause UEs to download the stored the media content from the MMSC.

In typical operation, when a sending device has media content to send to a UE using MMS, the sending device encodes the media content in a manner similar to how media content would be encoded for email communication (e.g., in Multipurpose Internet Mail Extension (MIME) format) and transmits the encoded media content directly or indirectly to the MMSC. Upon receipt, the MMSC then stores the content in a server that provides a Hypertext Transfer Protocol (HTTP) front end, and the MMSC then sends to the SMSC an SMS control message that specifies an address such as a Uniform Resource Locator (URL) of the content at that server and is coded to be an MMS notification. The SMSC then forwards that SMS control message to the UE in the manner described above, functioning to notify the UE that the media content is available for download from the indicated URL.

When a UE receives this SMS control message, application logic running at the UE could then detect that the SMS control message is an MMS notification. And in response, the application logic could cause the UE to automatically background-download the media content from the indicated URL and present the downloaded media content.

As to this automatic background-downloading, if the UE has an established data connection when the UE receives this SMS control message, the UE could automatically download the media content by sending an HTTP GET request to the indicated URL, in response to which the server would transmit the media content to the UE in much the same way that any web server would transmit media content to a web client. On the other hand, if the UE does not have an established data connection when the UE receives the SMS control message, then the UE may engage in processing to establish a data connection so as to then download the media content. For instance, the UE could engage in random access signaling and radio-connection signaling with the UE's serving access node, to set up an active wireless packet-data connection, and the UE could then engage in HTTP messaging over that data connection to download the media content.

Overview

Unfortunately, MMS message delivery to a UE may sometimes fail for various reasons. One reason for failure could be that the UE is powered off, in which case of course the UE would not even receive the SMS message defining the MMS notification. Another reasons for failure could be that, even if the UE is powered on, the UE might be set with its data service turned off, such that the UE would be unable to establish a data connection through which to request and download the media content from the MMSC in response to receiving the MMS notification.

In practice, for instance, the UE might have a user-configurable data-service switch that could be set in either of two modes: (i) data-service off, in which the UE would not seek to establish a wireless data connection even in a situation where wireless packet-data communication would arguably be appropriate, and (ii) data-service on, in which the UE would seek to establish a data connection when appropriate to engage in wireless packet-data communication. In a typical UE, this switch could be toggled from one mode to the other by using a software-based or hardware-based toggle function, such as a slider defined in a graphical user interface through which a user could configure settings of the UE.

With this switch set to data-service off, if and when the UE receives an SMS control message defining an MMS notification, the UE may acknowledge receipt of the SMS control message, but the UE would not automatically background-download the indicated media content from the MMSC, since the UE would not have or establish a data connection through which to engage in that downloading. As a result, the MMS message-delivery process could fail, which could create user-experience problems among other issues.

A particular technical problem here is that, when MMS message delivery to a UE fails, it may be unclear whether the failure occurred because the UE was powered off or rather because the UE's data service was turned off, among other possibilities.

The present disclosure provides a mechanism to help address this problem, as to MMS messaging or other analogous messaging.

In accordance with the disclosure, as to MMS messaging for instance, an MMSC that has sent to a UE an MMS notification indicating that media content is available for downloading will determine that the UE has received that MMS notification, which would confirm that the UE is powered on—thus eliminating the UE being powered off as a possible reason for failure of MMS message delivery. Further, the MMSC will determine that, upon expiration of a threshold long period of time after determining that the UE received the MMS notification, the MMSC has not received from the UE a request to download the media content from the MMSC. And in response to determining that that threshold period of time has passed without the MMSC receiving from the UE a request to download the media content, the MMSC will then transmit to the UE a special data-service-trigger control message that will trigger turning on data service of the UE, e.g., switching the UE from the data-service off mode to the data-service on mode, so as to enable the UE to engage in data communication with the MMSC.

For instance, in response to determining that that threshold period of time has passed without the MMSC receiving from the UE a request to download the media content, the MMSC could transmit to the UE an SMS control message to which the UE is configured to automatically respond by switching itself from data-service off mode to data-service on mode. Or the MMSC could transmit to the UE an SMS text message that, when presented by the UE, prompts a user of the UE to turn on data service of the UE.

Once the MMSC has transmitted this data-service-trigger message to the UE, or as part of sending this data-service-trigger message to the UE, the MMSC could further re-send to the UE the MMS notification for the message content. And having switched from data-service off mode to data-service on mode, the UE could then respond to the MMS notification by working to establish a data connection through which the UE could then request and download the media content from the MMSC.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified flow diagram illustrating interaction between elements of an example communication system in accordance with the present disclosure. As shown, the example communication system includes a media source 100, a media server 102, a control-messaging server 104, and a recipient device 106. In line with the discussion above, the media server 102 could function to receive and store media content that is to be delivered to the recipient device 106 and could include a front end such as a web server through which to receive and respond to a request from the recipient device to download the stored media content. And the control-messaging server 104 could function to receive from the media server a control message destined to the recipient device 106, to transmit the control message to the recipient device 106, and to receive from the recipient device 106 an acknowledgement of the transmitted control message and forward a corresponding acknowledgement to the media server 102.

Figure 1:
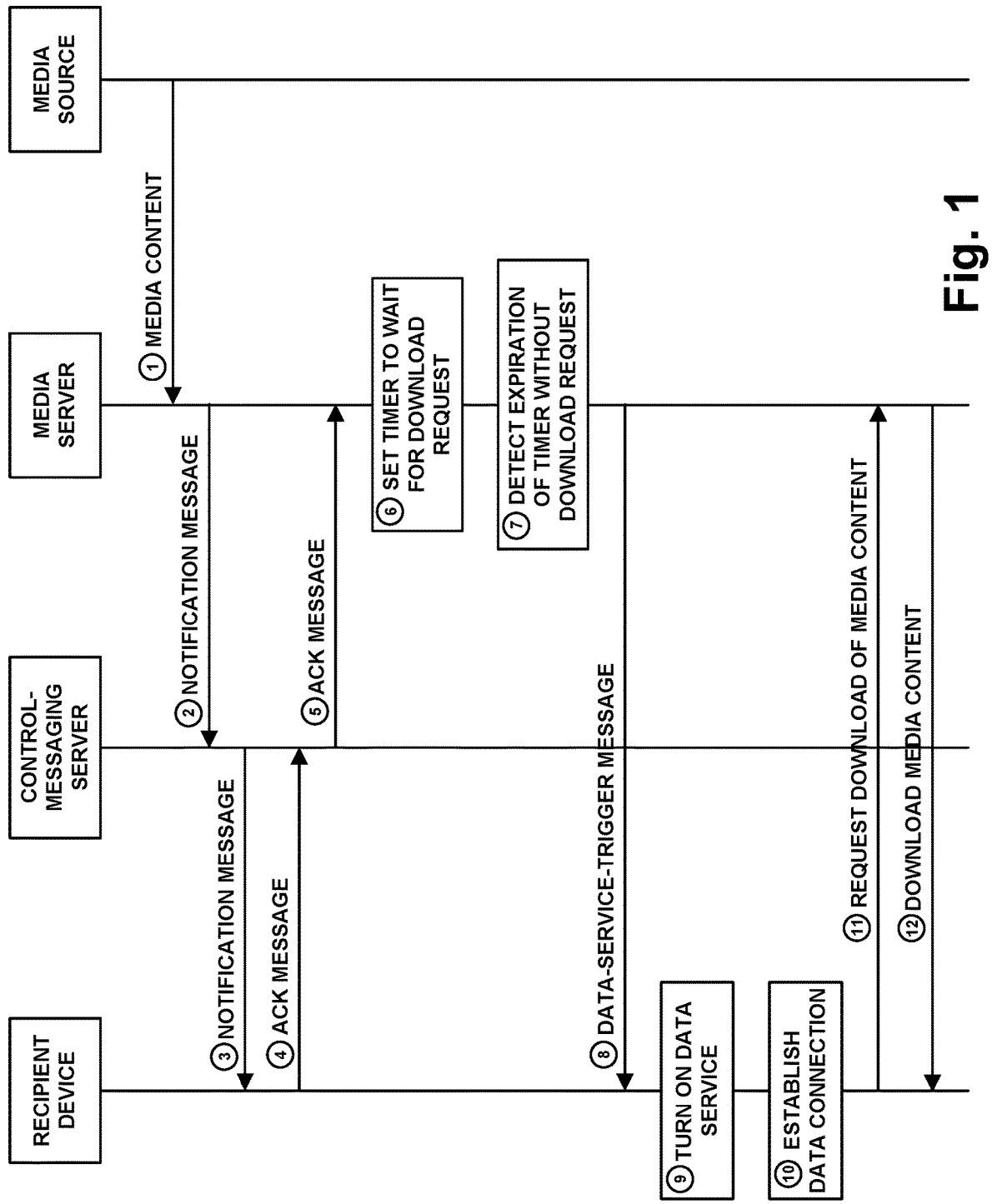
FIG. 1 is a simplified flow diagram illustrating interaction between elements of an example communication system in accordance with the present disclosure.

As shown in FIG. 1, at step 1, the media server 102 receives from the media source media content destined for delivery to the recipient device 106, which the media server then stores at an address such as a URL. At step 2, responsive to at least receiving and storing the media content that is destined for delivery to the recipient device 106, the media server 102 then sends to the control-messaging server 104 for delivery to the recipient device 106 a control message defining a notification message indicating that the media content is available for download from the address at the media server. And at step 3, the control-messaging server 104 responsively transmits the control message or the like to the recipient device 106.

At step 4, the control-messaging server 104 then receives from the recipient device 106 an acknowledgement message acknowledging that the recipient device received the control message sent in step 3. And at step 5, in response to the acknowledgement message received at step 4, the control-messaging server 104 sends to the media server 102, and the media server 102 thus receives from the control-messaging server 104, a corresponding acknowledgement message that indicates that recipient device 106 receive the control message (e.g., indicating that the control-messaging server 104 received from the recipient device 106 an acknowledgement of the control message sent at step 3).

At this point in the process, the media server 102 has thus learned that the recipient device 106 successfully received the control message indicating that the media content is available for download from the media server 102. A normal expectation at this point for a recipient device that receives such a control message and that has its data service turned on would be for the recipient device to then request and download the media content from the indicated address at the media server 102. But as indicated above, if data service at the recipient device 106 is turned off, the recipient device would be unable to establish a data connection through which to request and download the media content.

Per the present disclosure, upon so determining that the recipient device 106 received the control message indicating that the media content is available for download from the media server 102, at step 6, the media server 102 could then start a timer to run for a predefined period of time, awaiting receipt of a request from the recipient device 106 to download the media content from the media server 102. And the media server 102 could determine that the timer expires without the media server 102 having received from the recipient device 106 a request to download the media content from the media server 102.

The threshold period of time here could be a period of time that is deemed long enough to support a reasonable conclusion that something is preventing communication of a download request from the recipient device 102 to the media server even though the recipient device 102 received the control message, perhaps that the recipient device's data service is turned off. Therefore, upon expiration of the timer or in another manner, the media server 102 could thus determine, at step 7, that a predefined threshold long time has passed since the media server 102 determined that the recipient device 106 received the control message and that the media server 102 has not yet received from the recipient device 106 a request to download the media content.

In response to so determining that the predefined threshold long time has passed since the media server 102 determined that the recipient device 106 received the control message and that the media server 102 has not yet received from the recipient device 106 a request to download the media content, the media server 102 could then take action to help facilitate having the recipient device 102 download the media content. In particular, per the present disclosure, at step 8, the media server 102 could then transmit to the recipient device 106 a data-service-trigger message that triggers turning on data service of the recipient device 106 at step 9, so that the recipient device 106 would then be able to establish a data connection through which to engage in data communication with the media server 102.

For instance, the media server 102 could responsively transmit to the recipient device 106 a specially coded control message, perhaps an SMS control message via the control-messaging server 104, to which the recipient device 106 is configured to respond by switching itself from data-service off mode to data-service on mode. Upon receipt of that message, the recipient device 106 could thus switch from data-service off mode to data-service on mode.

Alternatively, the media server 102 could responsively transmit to the recipient device 106 an SMS message having text that, when presented by the recipient device 106, will function to prompt a user of the recipient device 106 to switch the recipient device 106 from data-service off mode to data-service on mode. For instance, such a prompt could state something along the lines of "Please turn on data service in order to receive message content." Thus, when the recipient device 106 receives that SMS message and presents text of the message, a user of the recipient device 106 could read the message and respond by switching the recipient device 106 from data-service off mode to data-service on mode.

In an example implementation, the data-service trigger message that the media server 102 sends to the recipient device 106 could also include and function as a re-send of the control message indicating that the media content is available for download from the address at the media server 102. For instance, the data-service trigger message could also carry with it the address of the media content at the media server 102 and could be interpretable by the recipient device 106 to cause the recipient device 106 to request and download the media content from that address once the recipient device 106 has been switched from data-service off mode to data-service on mode. Thus, in this implementation, once the recipient device 106 has been switched from data-service off mode to data-service on mode as a result of the data-service-trigger message, the recipient device 106 could then respond further to the data-service-trigger message by working to establish a data connection at step 10 and then engaging in communication through that data connection to request and download the media content from the indicated address at the media server 102 at steps 11 and 12.

In an alternative implementation, after the media server 102 has sent the data-service-trigger message to the recipient device 106, the media server 102 could then re-send to the recipient device 106 the control message indicating that the media content is available for download from the address at the media server. The media server 102 could re-send the control message upon passage of a predefined wait period after sending the data-service-trigger message to the recipient device, with the predefined wait period being deemed sufficiently long to allow time for the recipient device 106 to be switched into data-service on mode in response to the data-service-trigger message. Further, the media server 102 could re-send the control message conditional upon and possibly responsive to receipt by the media server 102 of an acknowledgement message indicating that the recipient device 106 received the data-service-trigger message.

In this implementation as well, once the recipient device 106 receives the re-sent control message, the recipient device 106 could then respond to that message by working to establish a data connection at step 10 and then engaging in communication through that data connection to request and download the media content from the indicated address at the media server 102 at steps 11 and 12.

Figure 2:
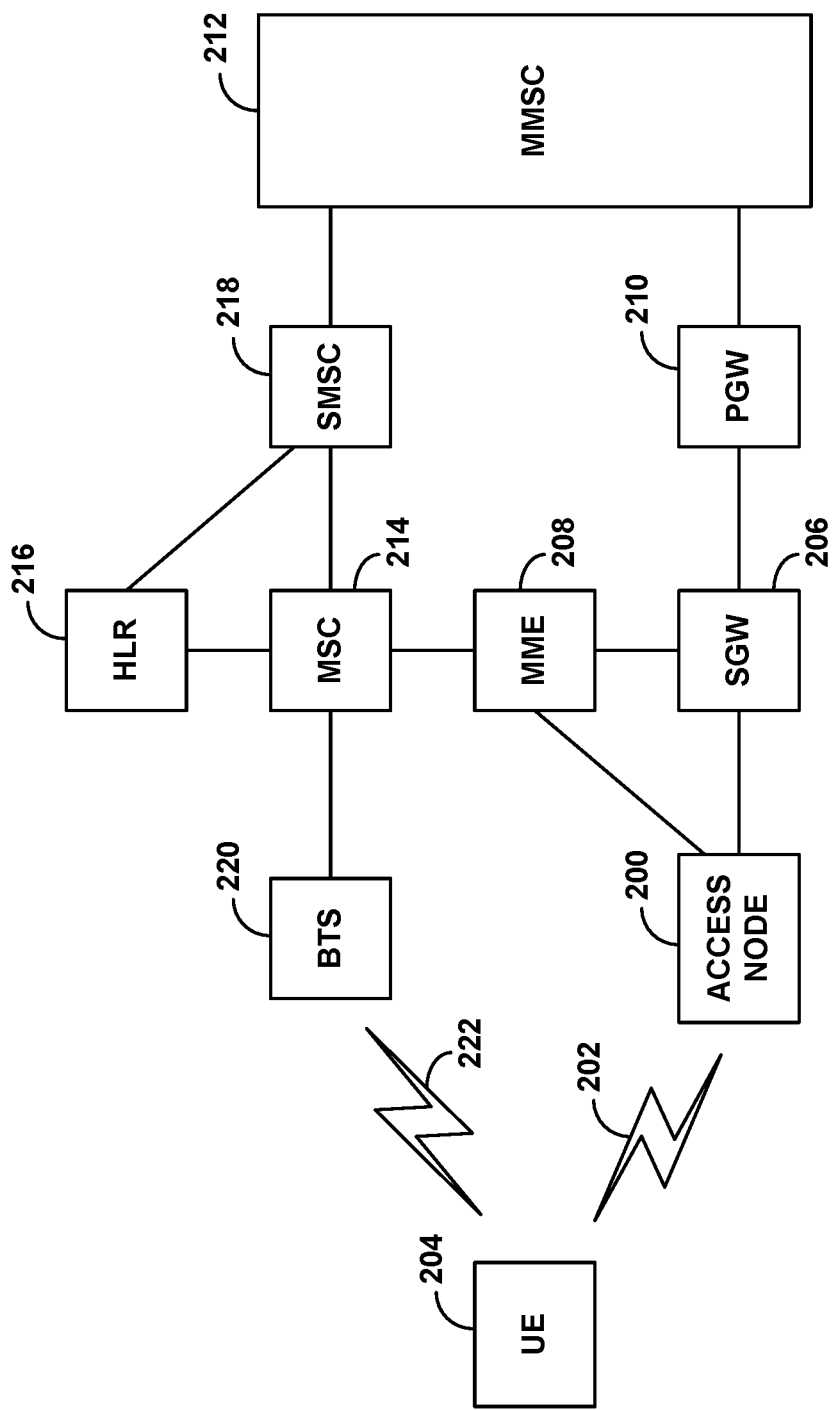
FIG. 2 is a simplified block diagram of an example communication system in which features of the disclosure can be implemented.

FIG. 2 is next a simplified block diagram of an example system in which the disclosed features could be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

The system of FIG. 2 includes an access node 200 that is configured to provide wireless communication service in a wireless coverage area 202, and the figure illustrates an example UE 204 that is positioned within coverage of the access node 200 and configured to be served by the access node 200.

The access node 200 and UE 204 could be configured to communicate with each other according to an established radio access technology (RAT), with communications from the access node to the UE defining a downlink or forward link and communications from the UE to the access node defining an uplink or reverse link. Examples of such RATs include, without limitation, Code Division Multiple Access (CDMA), Long Term Evolution (LTE), and 5G New Radio (5G NR).

In accordance with the RAT, the coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Further, the access node 200 could take various forms, examples of which include a macro access node of the type that provides a wide range of coverage, and a small-cell access node or the like that may provide a smaller range of coverage.

As further illustrated, in the example arrangement, the access node 200 has a communication interface with a serving gateway (SGW) 206 and a communication interface with a mobility management entity (MME) 208, the MME 208 has a communication interface with the SGW 206, and the SGW 206 has a communication interface with a packed-data-network gateway (PGW) 210, which provides connectivity to facilitate communication with various other network nodes, such as an MMSC 212.

In addition, to facilitate SMS messaging in this example arrangement, the arrangement is also shown including a legacy MSC 214, which has a communication interface with an HLR 216, the MSC 214 and HLR 216 each have a respective communication interface with an SMSC 218, and the SMSC 218 has a commination interface with the MMSC 212.

Further, the MSC 214 is also shown having a communication interface with a legacy base transceiver station (BTS) 220, which be configured to provide wireless communication service in wireless coverage area 222 in which the UE 204 might also be positioned.

With this example arrangement, when the UE 204 is in coverage of the access node 200 and coverage of the BTS 220, if UE 204 is set in the data-service off mode, the UE 204 may register for service with the BTS 220.

For instance, the UE 204 may transmit on an uplink access channel in coverage area 222 a random access message carrying a registration request, which the BTS 220 may forward to the MSC 214. And the MSC 214 may then send a registration notification message to the HLR 216 to record the fact that the UE 204 is accessible via the MSC 214.

After a period of no traffic-channel communication over the air between the UE 204 and the BTS 220, the UE 204 may then enter into an idle mode in which the UE 204 would still be registered with the BTS 220 but would operate in a low-power mode in which the UE would periodically scan for page messages or the like from the BTS 220 until a need arises to establish an active traffic channel between the UE 204 and the BTS 220.

When the UE 204 is so registered with the BTS 220, the UE 204 may be able to receive and acknowledge SMS messages through air-interface signaling between the BTS 220 and the UE 204.

For instance, when the SMSC 218 receives an SMS message to be delivered to the UE 204, the SMSC 218 could query the HLR 216 to find out what control entity is serving the UE 204 and thereby learn that the MSC 214 is serving the UE 204. The SMSC 218 could accordingly transmit the SMS message as a control-plane signaling message to the MSC 214, the MSC 214 could forward the SMS message as a signaling message to the BTS 220, and the BTS 220 could send the SMS message over the air to the UE 204. Upon receipt of the SMS message, if the SMS message is of the type to be presented, then the UE 204 could then present the SMS message, or if the SMS is a control message that would trigger action by the UE 204, then the UE 204 could respond accordingly if possible. Further, in response to receipt of the SMS message, the UE 214 could generate and transmit to the SMSC 218, via the BTS 220 and MSC 214, an acknowledgment signaling message that acknowledges the UE's receipt of the SMS message.

On the other hand, when the UE 204 is in coverage of the access node 200 and BTS 220, if UE 204 is set in the data-service on mode, the UE 204 may establish a wireless packet-data connection with access node 200, through which to engage in wireless-packet data communication.

For instance, the UE 204 could scan for and discover coverage of the access node 200 (e.g., based on a synchronization signal and reference signal broadcast by the access node 200) and could responsively engage in random-access signaling and Radio Resource Control (RRC) signaling with the access node 200 in order to establish an RRC connection between the UE 204 and the access node 200, thus putting the UE 204 in an RRC-connected mode in which the access node 200 could serve the UE 204 with wireless packet-data communications.

Further, upon initial RRC connection, the UE 204 could also engage in an attachment signaling with the MME 208 to register for service. Namely, the UE 204 could transmit via the access node 200 to the MME 208 an attach request. And after authenticating the UE 204, the MME 208 could coordinate setup of one or more bearers defining virtual packet tunnels between the UE 204 and the PGW 210, through which the UE 204 could engage in wireless packet-data communication. In addition, in response to attachment of the UE 204, the MME 208 could also signal to the MSC 214 to register the UE 204 as being a UE served by the MME 208, and the MSC 214 could responsively notify the HLR 216 that the UE is accessible via the MSC 214, to enable the UE to engage in SMS communication via the access node 200 and an interface between the MSC 214 and the MME 208.

After a period of no traffic-channel communication over the air between the UE 204 and the access node 200, the UE 204 may enter into an RRC-idle mode in which the UE 204 would still be attached but would operate in a low-power mode in which the UE 204 would periodically scan for page messages or the like from the access node 220 until a need arises to transition back from RRC-idle mode to RRC-connected mode in order to engage in wireless packet-data communication. If and when a need arises for the UE 204 to engage in wireless packet-data communication, the UE 204 could then once again engage in random-access signaling and RRC signaling with the access node 200 to re-establish an RRC connection.

When the UE 204 is operating in the RRC-connected mode, when the UE 204 has data to transmit, the 204 UE could transmit a control-plane message over the air to the access node 200 requesting an uplink air-interface resource grant, the access node 200 could assign uplink air-interface resources on which the UE 204 is to engage in the transmission, and the UE 204 could accordingly transmit the data on those resources to the access node 200, which could then pass over a bearer to the PGW 210 for transmission to a destination entity. And when the PGW 210 receives data for transmission to the UE 204, the PGW 210 could send the data over a bearer to the access node 200, and the access node 200 could schedule and provide transmission of the data on air-interface resources to the UE 204.

When the UE 204 is so served by the access node 200, whether in the RRC-idle mode or the RRC-connected mode, the UE 204 may be able to receive and acknowledge SMS messages through air-interface signaling between the access node 200 and the UE 204.

For instance, when the SMSC 218 receives an SMS message to be delivered to the UE 204, the SMSC 218 could query the HLR 216 and learn that the UE 204 is accessible via the MSC 214. The SMSC 218 could accordingly transmit the SMS message as a control-plane signaling message to the MSC 214, and the MSC 214 could then forward the SMS message to the MME 208. The MME 208 could in turn forward the SMS message to the access node 200, and the access node 200 could send the SMS message over the air to the UE 204. Here too, upon receipt of the SMS message, if the SMS message is of the type to be presented, then the UE 204 could then present the SMS message, or if the SMS is a control message that would trigger action by the UE 204, then the UE 204 could respond accordingly if possible. Further, in response to receipt of the SMS message, the UE 214 could generate and transmit to the SMSC 218, via the access node 200, the MME 208, and the MSC 214, an acknowledgment signaling message that acknowledges the UE's receipt of the SMS message.

With this example network arrangement, when MMSC 212 receives and stores media content to be transmitted as an MIMS message to the UE 204, the MMSC 212 could transmit an to the SMSC 218 an MIMS notification message that specifies a URL at the MMSC 212 (e.g., at an associated front end) of the stored media content, and the SMSC 218 could then transmit the MIMS notification as an SMS control message to the UE 204. In line with the discussion above, the UE 204 might then receive this SMS control message via BTS 220 or access node 200. Further, the UE may respond to this SMS control message by sending an acknowledgement message to the SMSC 218, and the SMSC 218 may responsively send a corresponding acknowledgement message to the MMSC 212, which informs MMSC 212 that the MMS notification was received by the UE 204.

As noted above, at this point, the expectation is that the UE 204 would respond to the MMS notification by sending an HTTP GET request to the indicated URL, to download the stored media content from the MMSC 212. Namely, if the UE 204 is not currently RRC connected with the access node 200, the UE 204 could then engage in random-access and RRC connection signaling with the access node 200 to establish an RRC connection. Upon establishing the RRC connection, the UE could then send the HTTP GET request (as a wireless-packet data communication) to the MMSC 212, receive an HTTP 200 OK response providing the UE 204 with the media content, and present the media content.

However, if the UE 204 is currently operating in the data-service off mode, the UE 204 would be unable to establish this RRC connection through which to engage in the wireless packet-data communication, and therefore, the UE 204 would not send the HTTP request, and the MMSC 212 accordingly would not receive the HTTP request from the UE 204.

In line with the discussion above, once the MMSC 212 determines that the UE 2-4 received the MMS notification, the MMSC 212 could set a timer to wait a threshold time period for the MMSC 212 to receive from the UE 204 an HTTP request requesting download of the media content. And upon expiration of that timer, if the MMSC 212 has not yet received from the UE 204 a request to download the media content, then the MMSC 212 could transmit to the UE a data-service-trigger message as discussed above.

For instance, the MMSC 212 could send this data-service-trigger message as a specially coded SMS control message, e.g., an SMS control message that carries a code to which the UE 204 is configured to respond to by automatically switching itself from the data-service off mode to the data-service on mode. And further, as noted above, the data-service-trigger message could also include a re-send of the MMS notification including the URL of the media content, and the UE 204 could be configured to respond to that aspect of the data-service-trigger message by establishing a wireless packet-data connection and then requesting and downloading the media content from that URL.

Alternatively, the MMSC 212 could send this data-service-trigger message as a more conventional SMS text message to the UE 204, with the text message being a prompt for a user of the UE 204 to manually switch the UE from the data-service off mode to the data-service on mode. And in response to the UE 204 presenting the text of this prompt, the user could thus accordingly switch the UE 204 from data-service off mode to data-service on mode.

Further, if the data-service-trigger message does not carry with it a re-send of the MMS notification message for instance, the MMSC 212 could then resend the MMS notification message to the UE 204 after having sent the data-service-trigger message to the UE 204, perhaps after a time period deemed to be a long enough wait to likely allow for the UE 204 to be switched from the data-service off mode to the data-service on mode. (Alternatively, data-service-trigger message could also be interpretable by the UE 204 to cause the UE to notify the MMSC 212 that the UE 204 is now in data-service on mode, in which case the MMSC's receipt of that notification from the UE 204 could be the trigger for the MMSC 212 resending the MMS notification message to the UE 204.) If the UE 204 has successfully entered into the data-service on mode, then when the UE 204 receives this re-send of the MMS notification, the UE 204 could then respond by establishing a wireless packet-data connection and then requesting and downloading the media content from the URL.

Figure 3:
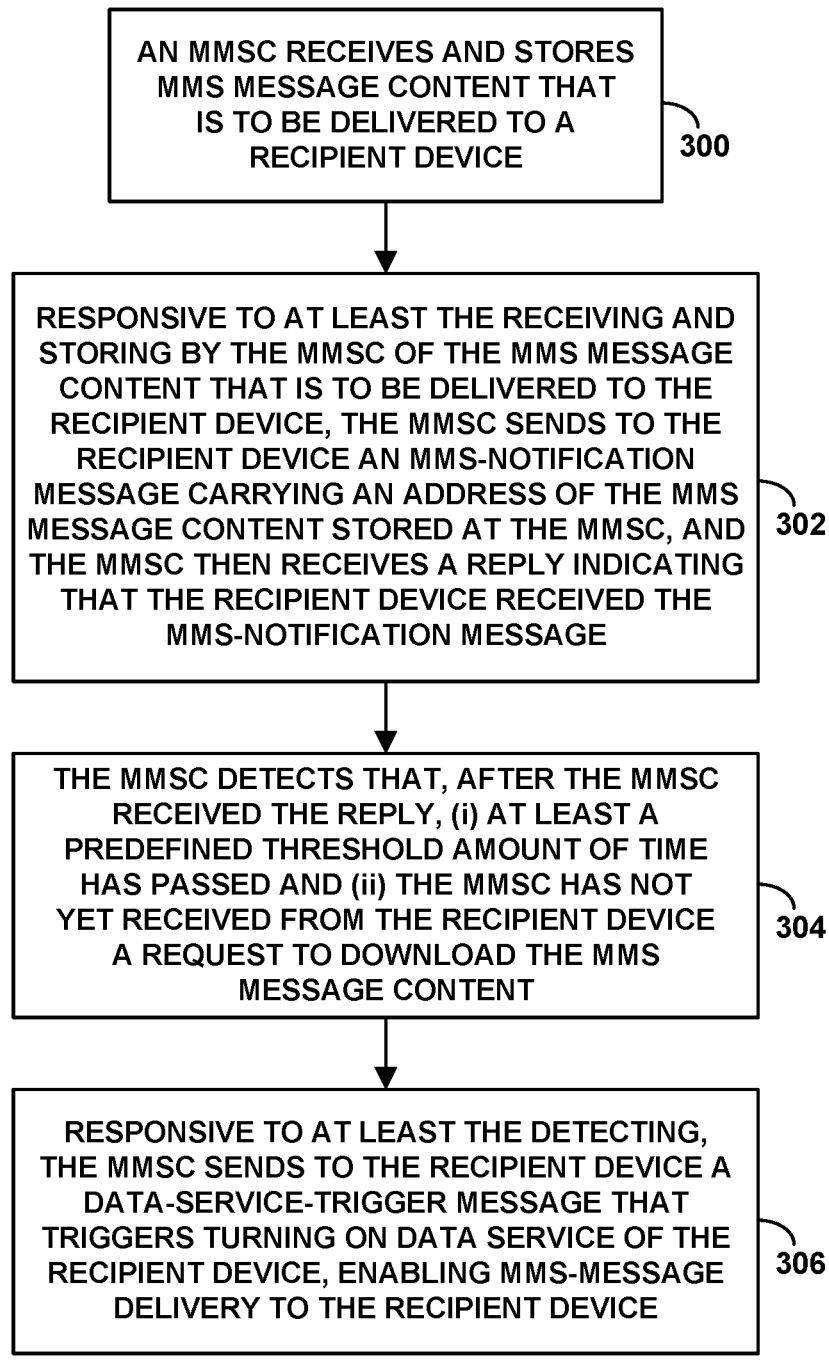
FIG. 3 is a flow chart depicting a method that could be carried out in accordance with the disclosure.

FIG. 3 is next a flow chart depicting a method that could be carried out by an MMSC in line with the discussion above, to enable MMS message delivery to a recipient device such as a UE for instance.

As shown in FIG. 3, at block 300, the MMSC receives and stores MMS message content that is to be delivered to the recipient device. At block 302, responsive to at least the receiving and storing by the MMSC of the MMS message content that is to be delivered to the recipient device, the MMSC sends to the recipient device an MMS-notification message carrying an address of the MMS message content stored at the MMSC, and the MMSC then receives a reply indicating that the recipient device received the MMS-notification message. At block 304, the MMSC then detects that, after the MMSC received the reply, (i) at least a predefined threshold amount of time has passed and (ii) the MMSC has not yet received from the recipient device a request to download the MMS message content. And at block 306, responsive to at least the detecting, the MMSC sends to the recipient device a data-service-trigger message that triggers turning on data service of the recipient device, which enables MMS-message delivery to the recipient device.

As discussed above, the method could additionally include, after the MMSC sends to the recipient device the data-service-trigger message that triggers turning on data service of the recipient device, the MMSC resending to the recipient device the MMS-notification message carrying the address of the MMS message content stored at the MMSC, and, responsive to resending the MMS-notification message, the MMSC then receiving from the recipient device a request to download the MMS message content.

As further discussed above, the act of the MMSC sending to the recipient device the data-service-trigger message that triggers turning on data service of the recipient device could involve sending the data-service-trigger message to the recipient device as an SMS message. Further, the act of sending from the MMSC to the recipient device the data-service-trigger message that triggers turning on data service of the recipient device could involve sending from the MMSC to the recipient device, as the data-service-trigger message, a message to which the recipient device is configured to automatically respond by turning on data service of the recipient device and/or a an SMS message that prompts a user of the recipient device to turn on data service of the recipient device.

In addition, the act of sending from the MMSC to the recipient device the MMS-notification message could involve sending the MMS-notification message from the MMSC to an SMSC that forwards the MMS-notification message to the recipient device. And the act of the MMSC receiving the reply indicating that the recipient device received the MMS-notification message could involve receiving by the MMSC from the SMSC a message indicating that the SMSC received from the recipient device an acknowledgement of the MMS-notification message.

Still further, as discussed above, the act of the MMSC detecting that, after the MMSC received the reply, at least the predefined threshold amount of time has passed could involve (i) upon the MMSC receiving the reply indicating that the SMSC received from the recipient device the acknowledgement of the MMS-notification message, the MMSC starting a timer for timing the predefined threshold amount of time, and (ii) the MMSC then detecting that the timer has reached the predefined threshold period of time.

Figure 4:
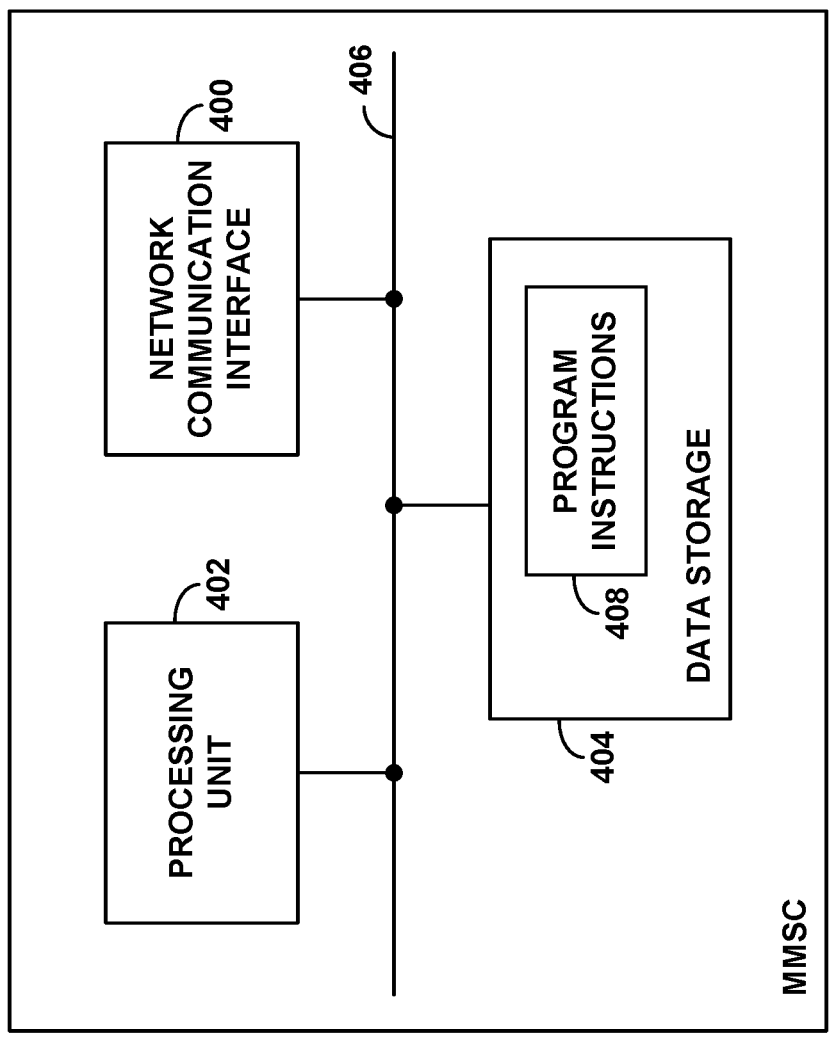
FIG. 4 is a simplified block diagram of an example MMSC or other media server operable in accordance with the disclosure.

FIG. 4 is next a simplified block diagram of an example MMSC or other media server that could be configured to implement features as described above. As shown in FIG. 4, the example MMSC could include a at least one network communication interface 400, at least one processing unit 402, at least one non-transitory data storage 404, all of which could be integrated together or communicatively linked together by a system bus, network, or one or more other connection mechanisms 406.

The at least one network communication interface 400 could include one or more network-interface ports and associated logic to facilitate engaging in signaling communication with an SMSC or the like and to facilitate engaging in packet-data communications such as HTTP communications as discussed above. The at least one processing unit 402 could then include one or more general purpose processors (e.g., microprocessors) and/or one or more specialized processors (e.g., application specific integrated circuits). And the at least one non-transitory data storage 404 could comprise one or more storage components, such as magnetic, optical, or flash storage. As shown, the non-transitory data storage 404 could hold program instructions 408, which could be executable by one or more of the at least one processing unit 402 to carry out various features as described herein, such as the features described with respect to FIG. 3 for instance.

Figure 5:
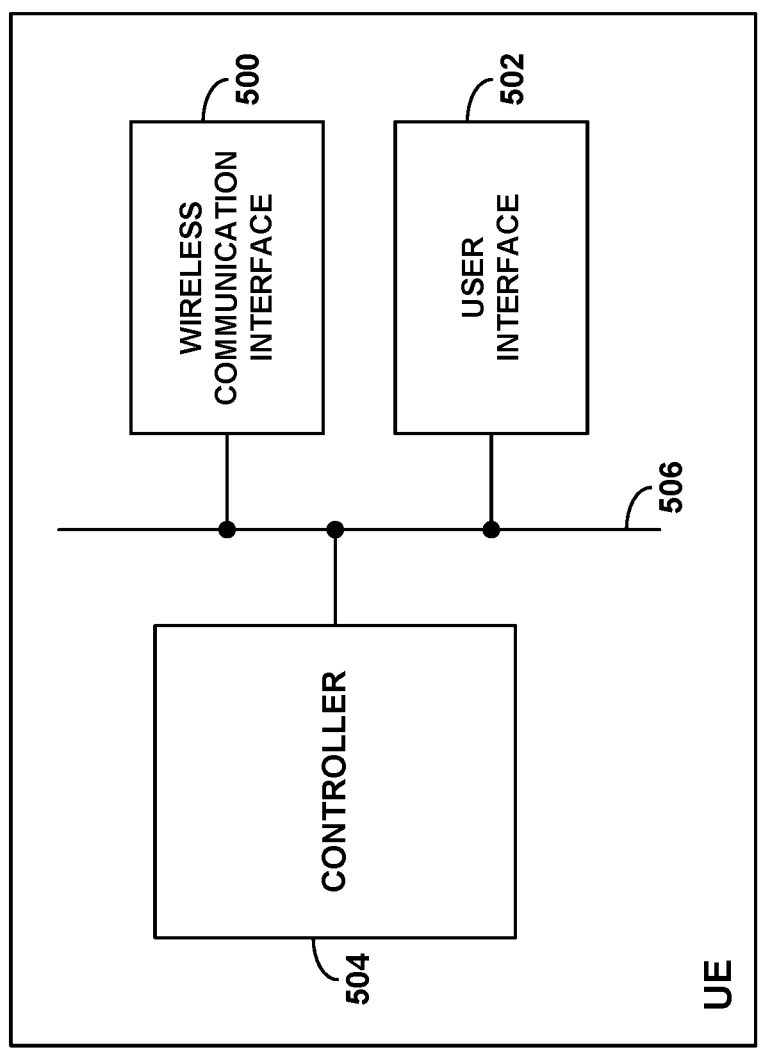
FIG. 5 is a simplified block diagram of an example UE or other recipient device operable in accordance with the disclosure.

Finally, FIG. 5 is a simplified block diagram of an example UE or other recipient device that could be configured to operate in accordance with the present disclosure. As shown, the example UE could include at least one wireless communication interface 500, at least one user interface 502, and at least one controller 504. These components could be interconnected, integrated in whole or in part, and/or could be communicatively linked together in various ways now known or later developed, such as by a system but or other connection mechanism 506 for instance.

Wireless communication interface 500 could include various components (not shown) such as a radio, power amplifiers, filters, and an antenna structure through which the UE could engage in wireless communication with an access node, BTS, or the like. User interface 502, which could be included if the UE is user operated, could include input and output components (not shown) to facilitate interaction with a user. For instance, the user interface could include a display and/or audio output mechanism for presenting SMS message text and MMS message content.

Controller 58, which could likewise comprise components (not shown) such as a processing unit, non-transitory data storage, and program instructions stored in the data storage and executable the processing unit, could operate to carry out (e.g., cause the UE to carry out) various operations described herein. For instance, these operations could include automatically responding to receipt of an SMS message as noted above by sending an acknowledgement message, and automatically responding to receipt of a data-service-trigger message as noted above by switching itself from data-service off mode to data-service on mode, so as to facilitate then establishing a data connection and receiving MMS message content.

The present disclosure also contemplates at least one computer readable medium having stored thereon (e.g., encoded with) program instructions executable by a processing unit to carry out various operations described above.

Exemplary embodiments have been described above. Those skilled in the art will understand, however, that changes and modifications may be made to these embodiments without departing from the true scope and spirit of the invention.

What is claimed is:
1. A method for enabling media-content delivery to a recipient device, the method comprising:
 receiving and storing, by a server, media content that is to be delivered to a recipient device;
 responsive to at least the receiving and storing by the server the media content that is to be delivered to the recipient device, sending from the server to the recipient device a notification message indicating availability of the stored media content to be downloaded, and then determining by the server that the recipient device received the notification message;

detecting by the server that a predefined threshold long time has passed since the server determined that the recipient device received the notification message and that the server has not yet received from the recipient device a request to download the media content; and responsive to at least the detecting, sending from the server to the recipient device a data-service-trigger message that triggers turning on data service of the recipient device.

2. The method of claim 1, further comprising, after sending from the server to the recipient device the data-service-trigger message that triggers turning on data service of the recipient device:

resending from the server to the recipient device the notification message indicating availability of the stored media content to be downloaded; and responsive to resending the notification message, receiving by the server from the recipient device a request to download the stored media content.

3. The method of claim 1, further comprising:

including in the data-service-trigger message a re-send of the notification message indicating availability of the stored media content to be downloaded; and responsive to the re-send of the notification message, receiving by the server from the recipient device a request to download the stored media content.

4. The method of claim 1, wherein sending from the server to the recipient device the data-service-trigger message that triggers turning on data service of the recipient device comprises sending the data-service-trigger message to the recipient device as a Short Message Service (SMS) message.

5. The method of claim 1, wherein sending from the server to the recipient device the data-service-trigger message that triggers turning on data service of the recipient device comprises sending from the server to the recipient device, as the data-service-trigger message, a message to which the recipient device is configured to automatically respond by turning on data service of the recipient device.

6. The method of claim 1, wherein sending from the server to the recipient device the data-service-trigger message that triggers turning on data service of the recipient device comprises sending from the server to the recipient device, as the data-service-trigger message, a Short Message Service (SMS) message that prompts a user of the recipient device to turn on data service of the recipient device.

7. The method of claim 1, wherein sending from the server to the recipient device the notification message comprises sending the notification message from the server to a Short Message Service Center (SMSC) that forwards the notification message to the recipient device, and wherein determining by the server that the recipient device received the notification message comprises receiving by the server from the SMSC a message indicating that the SMSC received from the recipient device an acknowledgement of the notification message.

8. The method of claim 7, wherein detecting by the server that the predefined threshold long time has passed since the server determined that the recipient device received the notification message comprises:

upon receiving by the server from the SMSC the message indicating that the SMSC received from the recipient device an acknowledgement of the notification message, starting by the server a timer for timing the predefined threshold long amount of time; and then detecting by the SMSC that the timer has reached the predefined threshold long period of time.

9. A computing system comprising:

at least one a network communication interface;

at least one processing unit;

at least one non-transitory data storage; and program instructions stored in the at least one non-transitory data storage and executable by the at least one processing unit to carry out operations for enabling media-content delivery to a recipient device, the operations including:

receiving and storing media content that is to be delivered to the recipient device, responsive to at least the receiving and storing the media content that is to be delivered to the recipient device, sending to the recipient device a notification message indicating availability of the stored media content to be downloaded, and then determining that the recipient device received the notification message, detecting that a predefined threshold long time has passed since the determining that the recipient device received the notification message and that a request from the recipient device a request to download the stored media content has not yet been received, and responsive to at least the detecting, sending to the recipient device a data-service-trigger message that triggers turning on data service of the recipient device.

10. The computing system of claim 9, wherein the operations additionally include, after sending to the recipient device the data-service-trigger message that triggers turning on data service of the recipient device:

resending to the recipient device the notification message indicating availability of the stored media content to be downloaded; and responsive to resending the notification message, receiving from the recipient device a request to download the stored media content.

11. The computing system of claim 9, wherein the operations additionally include:

including in the data-service-trigger message a re-send of the notification message indicating availability of the stored media content to be downloaded; and responsive to the re-send of the notification message, receiving from the recipient device a request to download the stored media content.

12. The computing system of claim 9, wherein sending to the recipient device the data-service-trigger message that triggers turning on data service of the recipient device comprises sending the data-service-trigger message to the recipient device as a Short Message Service (SMS) message.

13. The computing system of claim 9, wherein sending to the recipient device the data-service-trigger message that triggers turning on data service of the recipient device comprises sending to the recipient device, as the data-service-trigger message, a message to which the recipient device is configured to automatically respond by turning on data service of the recipient device.

14. The computing system of claim 9, wherein sending to the recipient device the data-service-trigger message that triggers turning on data service of the recipient device comprises sending to the recipient device, as the data-service-trigger message, a Short Message Service (SMS)

message that prompts a user of the recipient device to turn on data service of the recipient device.

15. The computing system of claim 9,
wherein sending to the recipient device the notification message comprises sending the notification message to a Short Message Service Center (SMSC) that forwards the notification message to the recipient device, and
wherein determining that the recipient device received the notification message comprises receiving from the SMSC a message indicating that the SMSC received from the recipient device an acknowledgement of the notification message.

16. The computing system of claim 15, wherein detecting that the predefined threshold long time has passed since the determining that the recipient device received the notification message comprises:
upon receiving from the SMSC the message indicating that the SMSC received from the recipient device an acknowledgement of the notification message, starting a timer for timing the predefined threshold long amount of time; and
then detecting that the timer has reached the predefined threshold long period of time.

17. At least one non-transitory computer readable medium having stored thereon program instructions executable by at least one processor to carry out operations for enabling media-content delivery to a recipient device, the operations comprising:
receiving and storing media content that is to be delivered to the recipient device;
responsive to at least the receiving and storing the media content that is to be delivered to the recipient device, sending to the recipient device a notification message indicating availability of the stored media content to be downloaded, and then determining that the recipient device received the notification message;
detecting that a predefined threshold long time has passed since the determining that the recipient device received the notification message and that a request from the recipient device a request to download the stored media content has not yet been received; and
responsive to at least the detecting, sending to the recipient device a data-service-trigger message that triggers turning on data service of the recipient device.

18. The at least one non-transitory computer readable medium of claim 17, wherein the operations additionally include, after sending to the recipient device the data-service-trigger message that triggers turning on data service of the recipient device:
resending to the recipient device the notification message indicating availability of the stored media content to be downloaded; and
responsive to resending the notification message, receiving from the recipient device a request to download the stored media content.

19. The at least one non-transitory computer readable medium of claim 17, wherein the operations additionally include:
including in the data-service-trigger message a re-send of the notification message indicating availability of the stored media content to be downloaded; and
responsive to the re-send of the notification message, receiving from the recipient device a request to download the stored media content.

20. The at least one non-transitory computer readable medium of claim 17, wherein sending to the recipient device the data-service-trigger message that triggers turning on data service of the recipient device comprises sending the data-service-trigger message to the recipient device as a Short Message Service (SMS) message.

* * * * *